US007007268B2

(12) United States Patent
Emberson (10) Patent No.: US 7,007,268 B2
(45) Date of Patent: Feb. 28, 2006

(54) METHOD AND APPARATUS FOR DEBUGGING IN A MASSIVELY PARALLEL PROCESSING ENVIRONMENT

(75) Inventor: David R. Emberson, Santa Cruz, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 676 days.

(21) Appl. No.: 10/105,977

(22) Filed: Mar. 25, 2002

(65) Prior Publication Data
US 2003/0037317 A1 Feb. 20, 2003

Related U.S. Application Data

(60) Provisional application No. 60/313,762, filed on Aug. 20, 2001.

(51) Int. Cl.
*G06F 9/44* (2006.01)
(52) U.S. Cl. .................. 717/127; 717/129; 712/227
(58) Field of Classification Search ............ 717/127, 717/129; 712/227
See application file for complete search history.

(56) References Cited

U.S. PATENT DOCUMENTS

| 5,193,187 | A | * | 3/1993 | Strout et al. ................. 710/261 |
| 5,274,797 | A | * | 12/1993 | Barlow et al. ................. 714/46 |
| 5,361,352 | A | * | 11/1994 | Iwasawa et al. ............ 717/124 |
| 5,452,437 | A | * | 9/1995 | Richey et al. .................. 714/4 |
| 5,548,717 | A | * | 8/1996 | Wooldridge et al. ........ 717/124 |
| 5,579,527 | A | * | 11/1996 | Chin et al. ..................... 712/16 |
| 5,754,839 | A | * | 5/1998 | Pardo et al. ................. 712/227 |
| 5,797,019 | A | * | 8/1998 | Levine et al. ................ 710/262 |
| 6,173,386 | B1 | * | 1/2001 | Key et al. ..................... 712/10 |
| 6,266,804 | B1 | * | 7/2001 | Isman ......................... 717/125 |
| 6,308,316 | B1 | * | 10/2001 | Hashimoto et al. ......... 717/127 |
| 6,345,295 | B1 | * | 2/2002 | Beardsley et al. .......... 709/224 |

(Continued)

OTHER PUBLICATIONS

Bacon et al., "Hardware Assisted Replay of Multiprocessor Programs", Dec. 1991; ACM SIGPLAN Notices, vol. 26, Issue 12, pp. 194-206.*
Mellor-Crummey et al., "A Software Instruction Counter", Apr. 1989; ACM SIGARCH Computer Architecture News, vol. 17, Issue 2, pp. 78-86.*
Dally, William J.; Fiske, J. A. Stuart; Keen, John S,; Lethin, Richard A,; Noakes, Michael D,; Nuth, Peter R.; Davison, Roy E,; Fyler, Gregory A,; "*The Message-Driven Processor: A Multicomputer Processing Node with Efficient Mechanisms:*" Journal ; Apr. 1992; pp. 23-39; MIT;, Cambridge, MA; USA.

*Primary Examiner*—Tuan Dam
*Assistant Examiner*—Matthew Dickeson
(74) *Attorney, Agent, or Firm*—Osha Liang LLP (57) ABSTRACT

A method for performing debugging of an executable source program in a massively parallel processing environment involves associating a major cycle counter and a minor cycle counter with each of a plurality of execution processors in the massively parallel processing environment, obtaining a first stopping point value associated with the major cycle counter and a second stopping point value associated with the minor cycle counter, executing instructions of the executable source program on each of the plurality of execution processors, modifying the major cycle counter and the minor cycle counter, and halting each of the plurality of execution processors and returning control to the user if the major cycle counter reaches the first stopping point value and the minor cycle counter reaches the second stopping point value.

31 Claims, 8 Drawing Sheets

U.S. PATENT DOCUMENTS

| | | | |
|---|---|---|---|
| 6,425,122 B1 * | 7/2002 | Klingman | 717/124 |
| 6,651,243 B1 * | 11/2003 | Berry et al. | 717/130 |
| 6,665,758 B1 * | 12/2003 | Frazier et al. | 710/200 |
| 6,681,384 B1 * | 1/2004 | Bates et al. | 717/129 |
| 6,854,075 B1 * | 2/2005 | Mukherjee et al. | 714/51 |
| 2003/0066054 A1 * | 4/2003 | Aarsts et al. | 717/129 |
| 2004/0040013 A1 * | 2/2004 | Kalra | 717/129 |
| 2004/0168155 A1 * | 8/2004 | O'Farrell et al. | 717/129 |

* cited by examiner (PRIOR ART)
FIGURE 1

METHOD AND APPARATUS FOR DEBUGGING IN A MASSIVELY PARALLEL PROCESSING ENVIRONMENT

CROSS-REFERENCE TO RELATED APPLICATION

This application claims benefit of U.S. Provisional Application Ser. No. 60/313,762, filed Aug. 20, 2001, entitled "Phasers-Compiler Related Inventions," in the names of Liang T. Chen, Jeffrey Broughton, Derek Pappas, William Lam, Thomas M. McWilliams, Ihao Chen, Ankur Narang, Jeffrey Rubin, Earl T. Cohen, Michael Parkin, Ashley Saulsbury, and David R. Emberson.

BACKGROUND OF INVENTION

An error or "bug" in a computer program (i.e., executable source program) is one that causes the computer program to malfunction in some way. Debugging refers to the process in which the errors in the computer program are found and removed. Finding an error in a computer program running in a massively parallel processing (MPP) environment can be extremely difficult and time intensive. Before further discussing this problem, an overview of an MPP environment is provided using FIG. 1.

MPP environments are computer environments that operate using a massive number of processors. It is typical for an MPP environment to use tens of thousands of processors. Each processor in such an environment is able to execute computer instructions at the same time, which results in a very powerful system because many calculations take place simultaneously. Such an environment is useful for a wide variety of purposes. One such purpose is for the software simulation of a hardware logic design.

Figure 1:
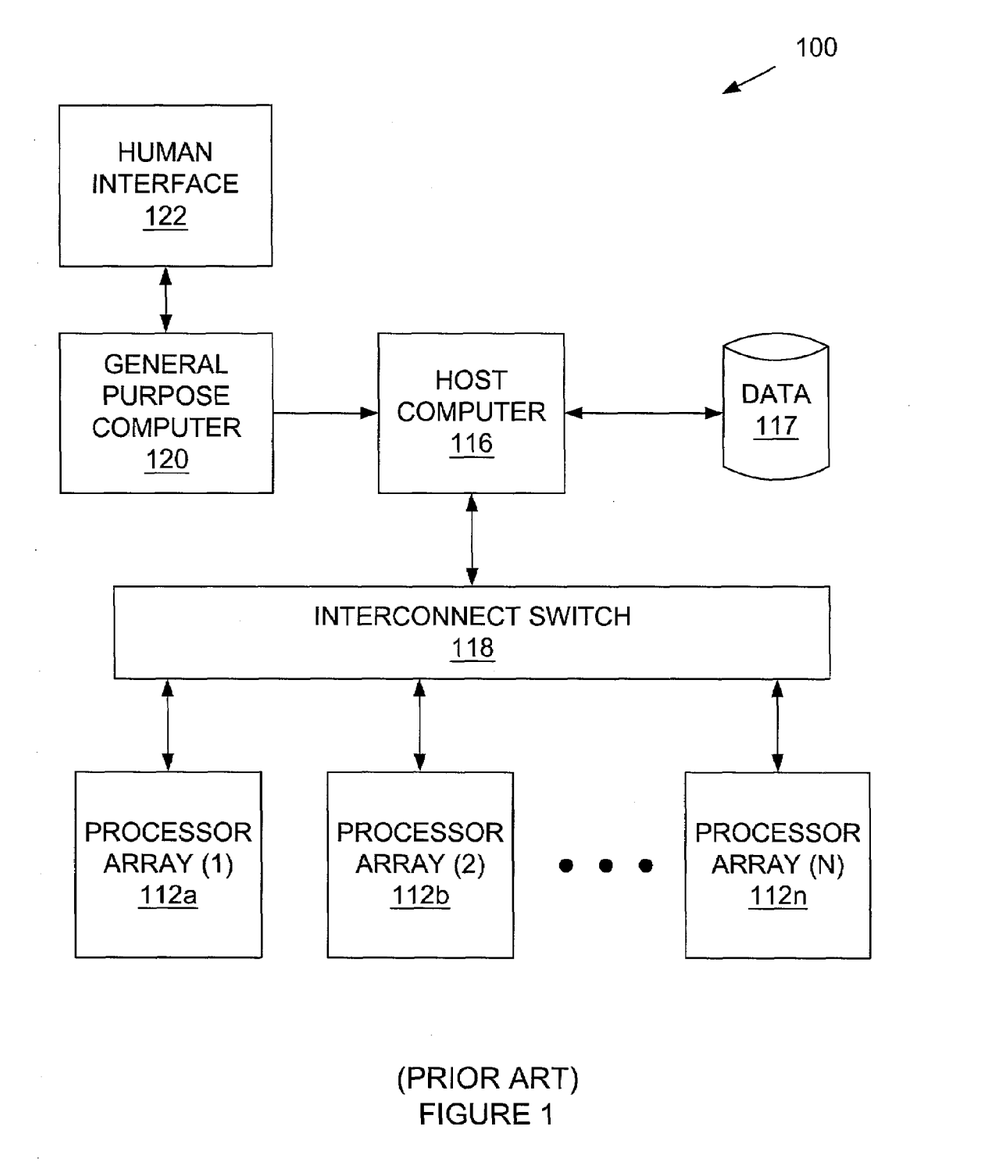
FIG. 1 shows a typical parallel computer system.

Large logic simulations are frequently executed on parallel or massively parallel computing systems. For example, parallel computing systems may be specifically designed parallel processing systems or a collection, referred to as a "farm," of connected general purpose processing systems. FIG. 1 shows a block diagram of a typical parallel computing system (100) used to simulate an HDL logic design. Multiple processor arrays (112a, 112b, 112n) are available to simulate the HDL logic design. A host computer (116), with associated data store (117), controls a simulation of the logic design that executes on one or more of the processor arrays (112a, 112b, 112n) through an interconnect switch (118). The processor arrays (112a, 112b, 112n) may be a collection of processing elements or multiple general purpose processors. The interconnect switch (118) may be a specifically designed interconnect or a general purpose communication system, for example, an Ethernet network.

A general purpose computer (120) with a human interface (122), such as a graphical user interface (GUI) or a command line interface, together with the host computer (116) support common functions of a simulation environment. These functions typically include an interactive display, modification of the simulation state, setting of execution breakpoints based on simulation times and states, use of test vectors files and trace files, use of HDL modules that execute on the host computer and are called from the processor arrays, check pointing and restoration of running simulations, the generation of value change dump files compatible with waveform analysis tools, and single execution of a clock cycle.

The software simulation of a hardware logic design involves using a computer program to cause a computer system to behave in a manner that is analogous to the behavior of a physical hardware device. Software simulation of a hardware logic design is particularly beneficial because the actual manufacturing of a hardware device can be expensive. Software simulation allows the user to determine the efficacy of a hardware design. Software simulation of a hardware logic design is well-suited for use in an MPP environment because hardware normally performs many activities simultaneously.

When simulating a hardware logic design in an MPP environment, or executing any other type of computer program in such an environment, debugging the program may become necessary. Properly performed debugging of the computer program reduces the probability of errors that could result in a malfunction. In the case of hardware logic design simulation, such an error might result in the eventual fabrication of computer hardware that does not work as expected. Such a malfunction is expensive and wasteful, so debugging plays an important role.

One common method for debugging is to single-step the execution of the computer program. Each step represents an instruction executed on a processor of the computer. At each step, the state of the simulation system, including the variables and registers, is examined. By examining the state of the simulation system at each progressive step, the person debugging the program is able to inspect the program and determine precisely where the problem begins to manifest itself. Once this is known, the person is better able to correct the program and remove the bug.

Another common method for debugging is to insert a breakpoint into the program so execution of the program stops at the inserted breakpoint. This is similar to single-stepping, but the breakpoint is used to specify a specific place to stop execution and examine the state of the simulation system. Breakpoints may normally be inserted at any instruction in a sequence of instructions. At the breakpoint, a determination may be made if there is a problem with the program at that point. By changing the breakpoint, the manifestation of the problem may be precisely found and can then be corrected.

Single-stepping a program or performing a breakpoint in an environment where there are tens of thousands of parallel processors can be extremely difficult. In particular, MPP environments include a massive number of parallel processors, each executing instructions simultaneously. There is no effective way to synchronously halt a massive number of processors executing simultaneously. In particular, to halt all of the processors requires a global signal to be sent to all of the processors. The time the global signal takes to propagate through the system to reach each of the processors differs depending on the distance the signal has to travel. Thus, some of the processors in the system surpass the intended stopping point where the global signal attempted to stop the processors, which makes debugging impossible. Thus, clock skew and speed of light considerations prevent gated clocks and global control systems from being used.

SUMMARY OF INVENTION

In general, in one aspect, the invention relates to a method for performing debugging of an executable source program in a massively parallel processing environment. The method comprises associating a major cycle counter and a minor cycle counter with each of a plurality of execution processors in the massively parallel processing environment, obtaining a first stopping point value associated with the major cycle counter and a second stopping point value associated with the minor cycle counter, executing instructions of the executable source program on each of the plurality of execution processors, modifying the major cycle counter and the minor cycle counter, and halting each of the plurality of execution processors and returning control to the user if the major cycle counter reaches the first stopping point value and the minor cycle counter reaches the second stopping point value.

In general, in one aspect, the invention relates to a method for performing debugging of an executable source program in a massively parallel processing environment. The method comprises associating a major cycle counter and a minor cycle counter with each of a plurality of execution processors in the massively parallel processing environment, obtaining a first stopping point value associated with the major cycle counter and a second stopping point value associated with the minor cycle counter, executing instructions of the executable source program on each of the plurality of execution processors, modifying the major cycle counter and the minor cycle counter, halting each of the plurality of execution processors and returning control to the user if the major cycle counter reaches the first stopping point value and the minor cycle counter reaches the second stopping point value, inspecting and modifying the executable source program, storing the first stopping point value in a memory register, storing the second stopping point value in a memory register, storing the major cycle counter in a memory register, and storing the minor cycle counter in a memory register.

In general, in one aspect, the invention relates to an execution control system configured for a massively parallel processing environment. The execution control system comprises a major cycle counter and a minor cycle counter configured to be associated with each of a plurality of execution processors in the massively parallel processing environment, a memory register to store a first stopping point value associated with the major cycle counter, a memory register to store a second stopping point value associated with the minor cycle counter, and an executable source program. Each of the plurality of execution processors is halted and control is returned to the user to inspect and modify the executable source program if the first stopping point value is equal to the major cycle counter and second stopping point value is equal to the minor cycle counter.

In general, in one aspect, the invention relates to an execution control system configured for a massively parallel processing environment. The execution control system comprises a major cycle counter and a minor cycle counter configured to be associated with each of a plurality of execution processors in the massively parallel processing environment, a memory register to store a first stopping point value associated with the major cycle counter, a memory register to store a second stopping point value associated with the minor cycle counter, an executable source program, a memory register to store the major cycle counter, and a memory register to store the minor cycle counter. Each of the plurality of execution processors is halted and control is returned to the user to inspect and modify the executable source program if the first stopping point value is equal to the major cycle counter and second stopping point value is equal to the minor cycle counter.

In general, in one aspect, the invention relates to a computer system to perform debugging of an executable source program in a massively parallel processing environment. The computer system comprises a processor, a memory, and software instructions stored in the memory for enabling the computer system under control of the processor, to perform associating a major cycle counter and a minor cycle counter with each of a plurality of execution processors in the massively parallel processing environment, obtaining a first stopping point value associated with the major cycle counter and a second stopping point value associated with the minor cycle counter, executing instructions of the executable source program on each of the plurality of execution processors, modifying the major cycle counter and the minor cycle counter, and halting each of the plurality of execution processors and returning control to the user if the major cycle counter reaches the first stopping point value and the minor cycle counter reaches the second stopping point value.

In general, in one aspect, the invention relates to an apparatus for performing debugging of an executable source program in a massively parallel processing environment. The apparatus comprises means for associating a major cycle counter and a minor cycle counter with each of a plurality of execution processors in the massively parallel processing environment, means for obtaining a first stopping point value associated with the major cycle counter and a second stopping point value associated with the minor cycle counter, means for executing instructions of the executable source program on each of the plurality of execution processors, means for modifying the major cycle counter and the minor cycle counter, and means for halting each of the plurality of execution processors and returning control to the user if the major cycle counter reaches the first stopping point value and the minor cycle counter reaches the second stopping point value.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

The present invention involves a method and apparatus for debugging in a massively parallel processing environment. In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
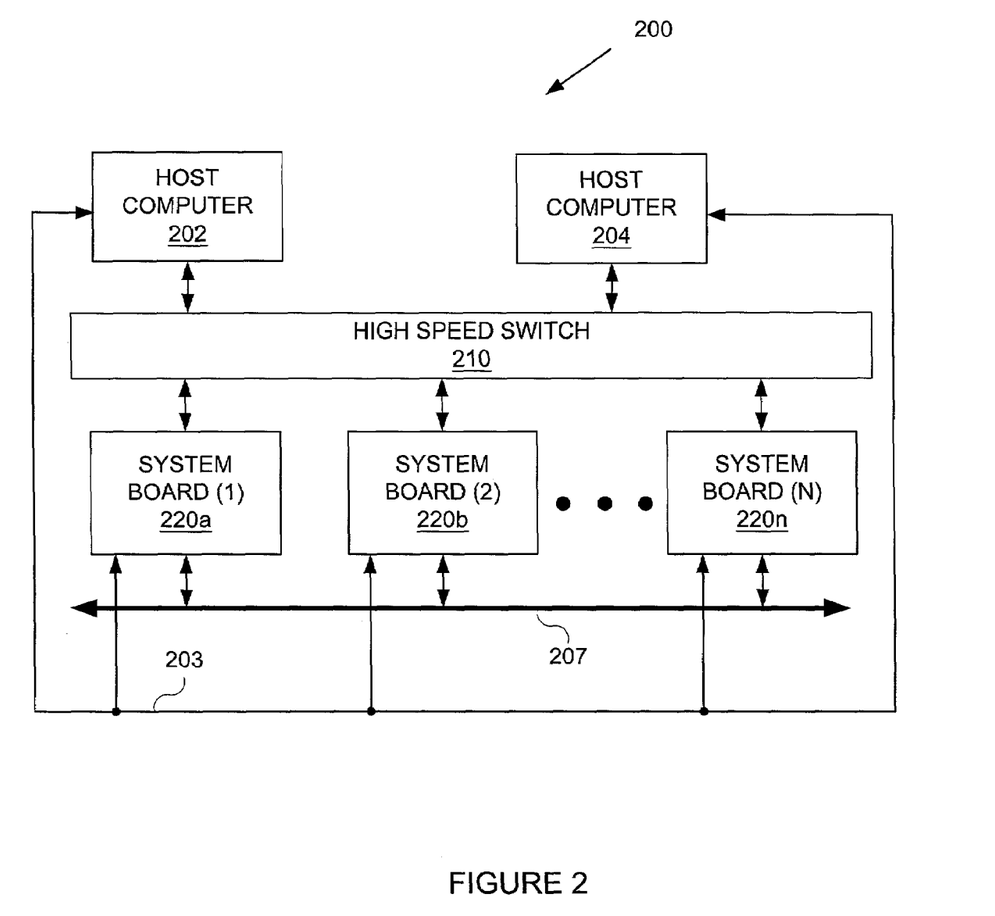
FIG. 2 shows a parallel computer system in accordance with one embodiment of the present invention.
Figure 3:
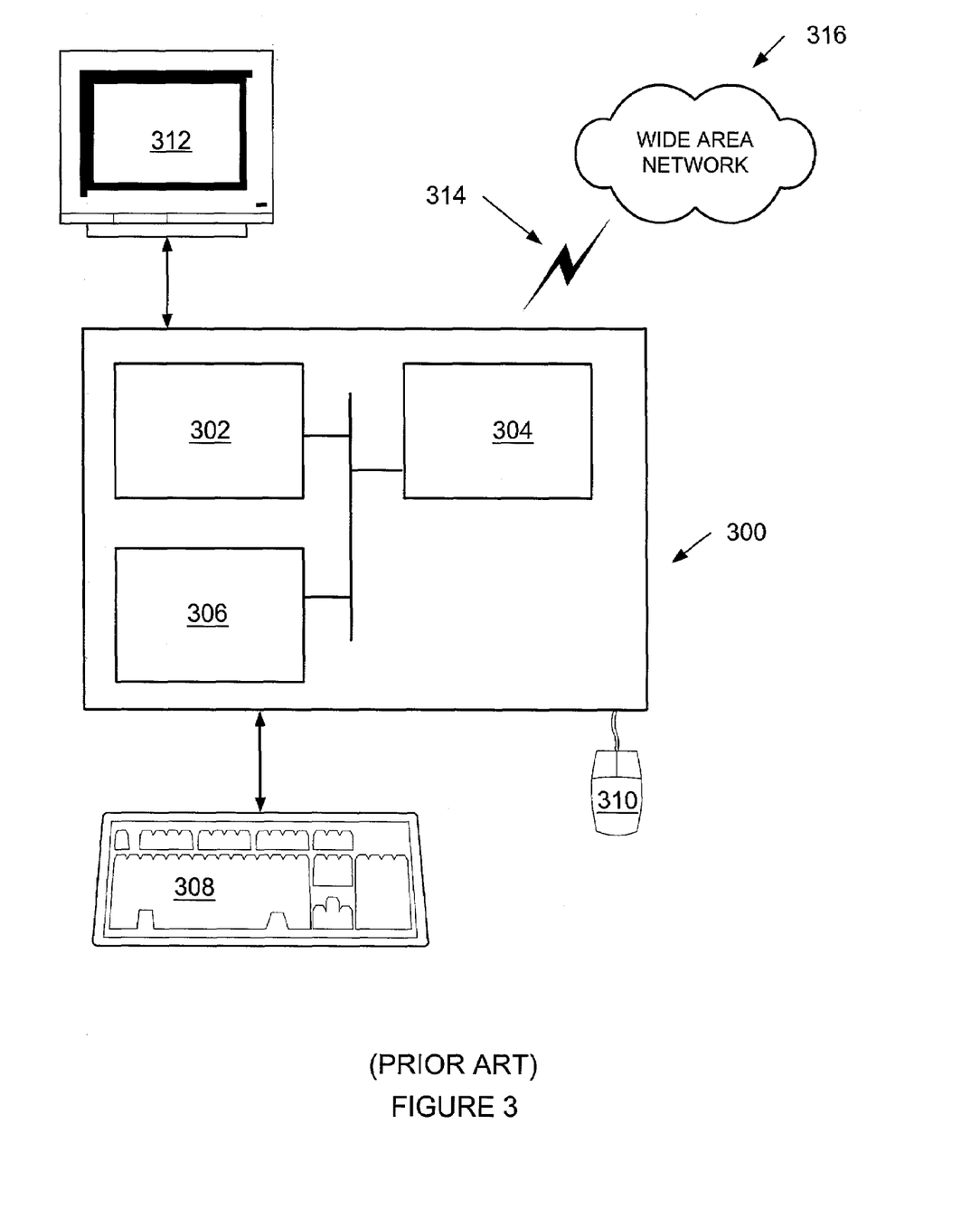
FIG. 3 shows a general purpose computer system.

A computer execution environment and a class of simulation systems, e.g., multiple instruction, multiple data (MIMD), used with one or more embodiments of the invention is described in FIGS. 2–3. In an embodiment of the present invention, the computer execution environment may use execution processors to execute execution processor code on a general purpose computer, such as a SPARC™ workstation produced by Sun Microsystems, Inc., or specialized hardware for performing cycle-based computations, e.g., a Phaser system.

The system on which a compiled hardware design logic may be executed in one or embodiments of the invention is a massively parallel, cycle-based computing system. The system uses an array of execution processors arranged to perform cycle-based computations. One example of cycle-based computation is simulation of a cycle-based design written in a computer readable language, such as HDL (e.g., Verilog, etc.), or a high-level language (e.g., Occam, Modula, C, etc.).

FIG. 2 shows exemplary elements of a massively parallel, cycle-based computing system (200), in accordance with one or more embodiments of the present invention. Cycle-based computation, such as a logic simulation on the system (200), involves one or more host computers (202, 204) managing the logic simulation(s) executing on one or more system boards (220a, 220b, 220n). Each system board contains one or more Application Specific Integrated Circuits (ASIC). Each ASIC contains multiple execution processors. The host computers (202, 204) may communicate with the system boards (220a, 220b, 220n) using one of several pathways. The host computers (202, 204) include interface hardware and software as needed to manage a logic simulation.

A high speed switch (210) connects the host computers (202, 204) to the system boards (220a, 220b, 220n). The high speed switch (210) is used for loading and retrieval of state information from the execution processors located on ASICs on each of the system boards (220a, 220b, 220n). The connection between the host computers (202, 204) and system boards (220a, 220b, 220n) also includes an Ethernet connection (203). The Ethernet connection (203) is used for service functions, such as loading a program and debugging. The system also includes a backplane (207). The backplane (207) allows the ASICs on one system board to communicate with the ASICs of another system board (220a, 220b, 220n) without having to communicate with an embedded controller located on each system board. Additional system boards may be added to the system by connecting more system boards to the backplane (207).

In one or more embodiments of the present invention, the computer execution environment to perform evaluation of design nodes in a cycle-based, logic simulation system may be a general purpose computer, such as a SPARC™ workstation produced by Sun Microsystems, Inc. For example, as shown in FIG. 3, a typical general purpose computer (300) has a processor (302), associated memory (304), a storage device (306), and numerous other elements and functionalities typical to today's computers (not shown). The computer (300) has associated therewith input means such as a keyboard (308) and a mouse (310), although in an accessible environment these input means may take other forms. The computer (300) is also associated with an output device such as a display device (312), which may also take a different form in an accessible environment. The computer (300) is connected via a connection means (314) to a Wide Area Network (WAN) (316). The computer (300) may be interface with a massively parallel, cycle-based computing system described above and as shown in FIG. 2.

The computer systems described above are for purposes of example only. An embodiment of the invention may be implemented in any type of computer system or programming or processing environment.

The timing of an executing computer program is defined, in one or more embodiments of the present invention, in terms of major and minor cycles. A major cycle refers to a sequence of instructions that an execution processor is scheduled to execute. A minor cycle refers to each instruction that each execution processor executes at each clock cycle. The program memory of an execution processor that functions using major and minor cycles is shown in accordance with one embodiment of the present invention in FIG. 4. While executing, the execution processor executes instructions loaded into a program memory (400) until a last instruction (410) in the program memory is reached. Reaching the last instruction (410) causes the execution processor to return (405) to an initial memory location (420).

Figure 4:
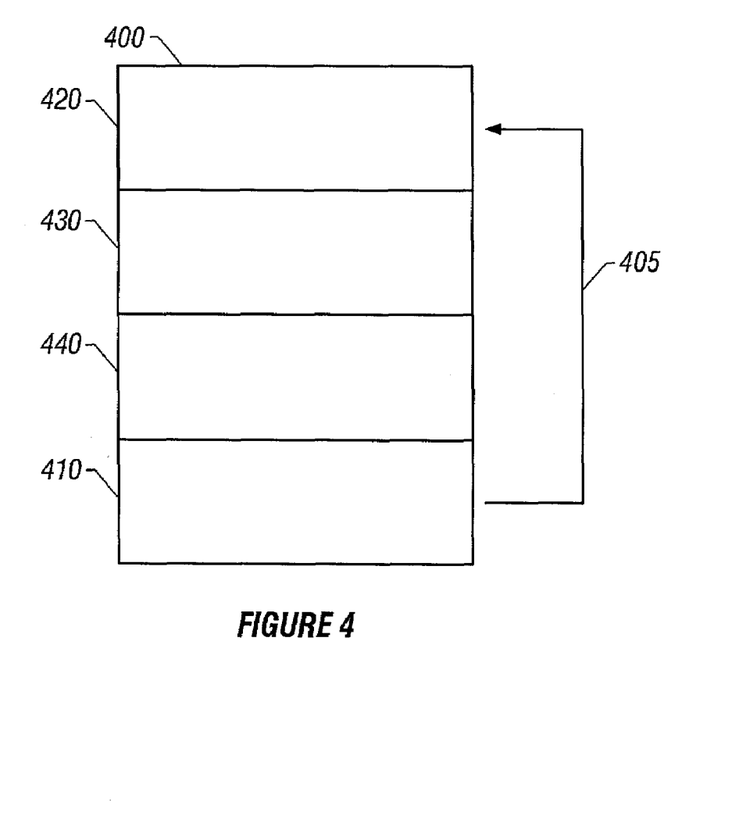
FIG. 4 shows a program memory of a processor that functions using major and minor cycles in accordance with one embodiment of the present invention.

The transition from a current instruction (430) to a next instruction (440) is termed a minor cycle, and constitutes a single global execution clock cycle. Each execution processor in a MPP system typically has a similar memory and simultaneously executes one instruction in the program memory in each of the global execution clock cycles. The execution of the sequence of instructions from the initial instruction (420), through the remaining sequence of instructions, to the last instruction (410), and back (405) to the initial position (420) is termed a major cycle (450). One skilled in the art will appreciate that an identical number of instructions are not required to be loaded into each execution processor's memory although the number of instructions is a pre-determined number. A final instruction may be inserted into shorter sequences to cause a particular execution processor to wait a specified number of clock cycles before returning (405) to the initial position (420) and starting a new major cycle.

In one embodiment, two counters are placed in each processor of the MPP system. The counters are termed a "major cycle" counter and a "minor cycle" counter. The major cycle counter changes value (increments or decrements) each time a major cycle is completed. The minor cycle counter changes value (increments or decrements) at each global execution clock cycle. A stopping point is defined by a major and minor cycle count.

Figure 5:
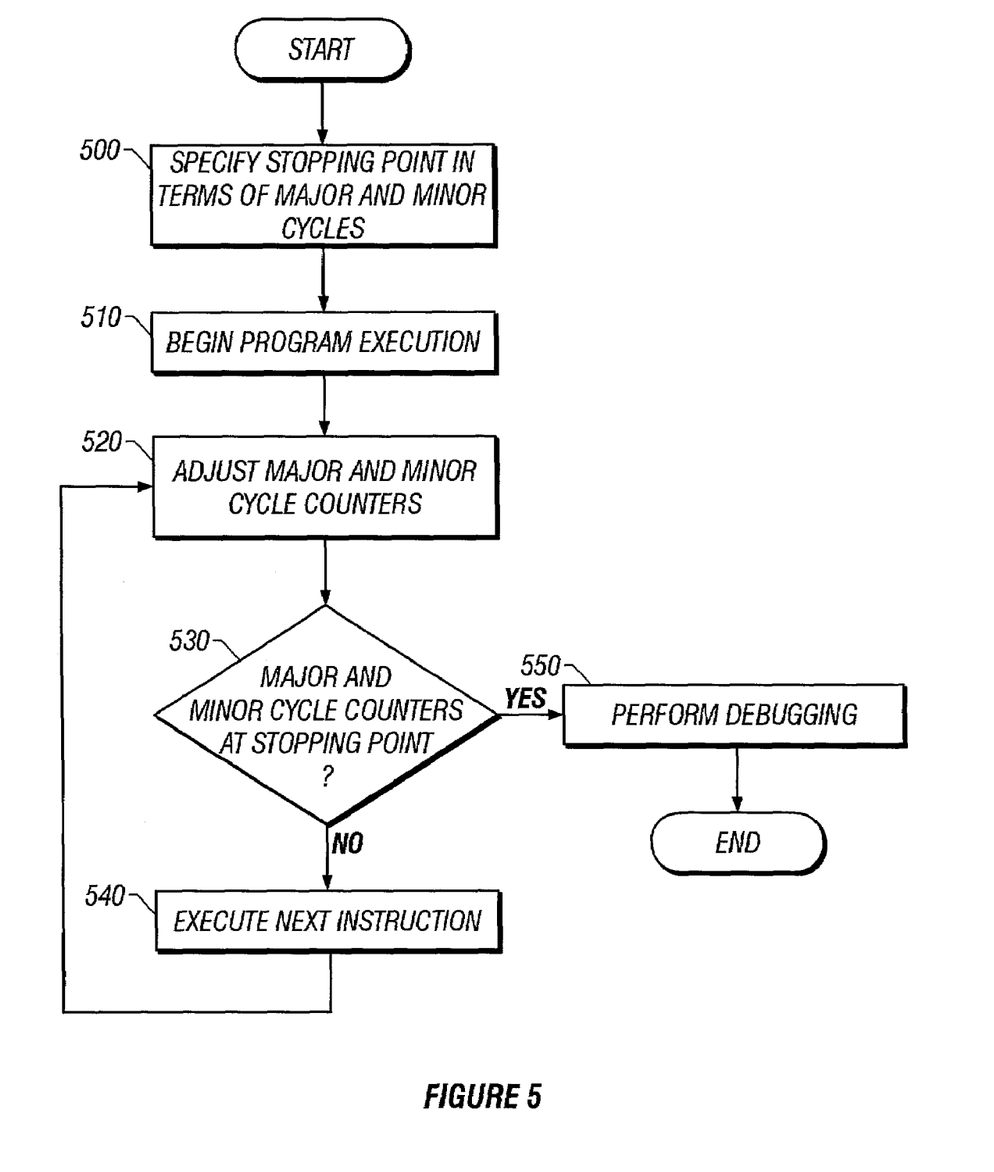
FIG. 5 shows debugging in an MPP environment in accordance with one embodiment of the present invention.

Embodiments of the present invention use a stopping point to debug the program that is executing in the MPP system. One embodiment is shown in FIG. 5. A stopping point value is specified in terms of major and minor cycles by a user (Step 500). The program begins executing, for instance, by each execution processor executing an instruction in the program memory (Step 510). The major and minor cycle counters are modified (Step 520). A determination is made whether the major and minor cycle counters are at the stopping point (Step 530). If not, the next instruction is executed (Step 540) and Step 520 repeats. If, however, the stopping point is reached (Step 530), then control is returned to the user and debugging is performed (Step 550).

Figure 6:
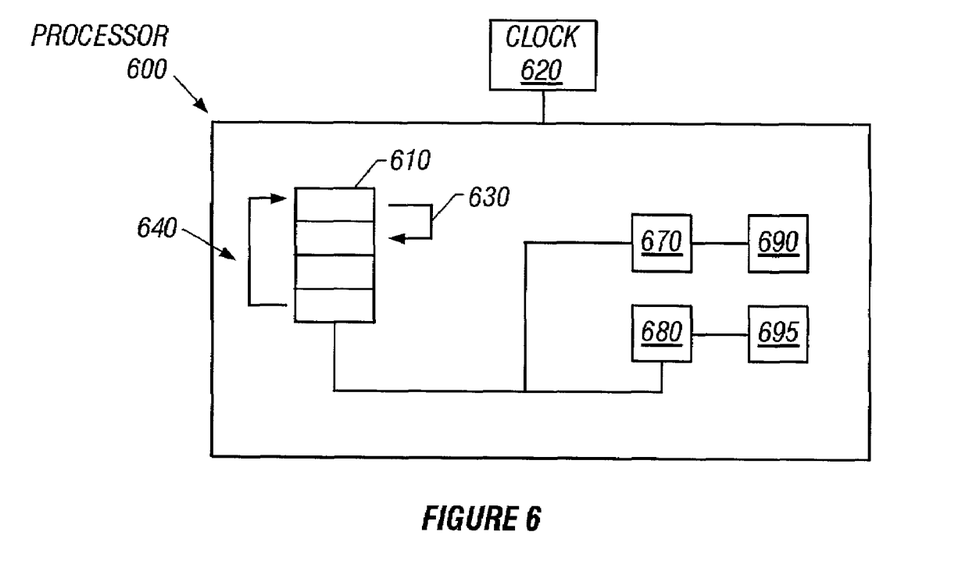
FIG. 6 shows debugging in an MPP environment according to an embodiment of the present invention.

Another embodiment of the present invention is carried out using an architecture in each execution processor as shown in FIG. 6. An execution processor (600) includes a program memory (610) for storing instructions. A global execution clock (620) controls the timing that the execution processor (600) executes the instructions. At each oscillation of the clock (620), a next instruction in the program memory (610) is executed, creating a minor cycle (630). A major cycle (640) is reached when the system transitions between a final instruction 650 and a first instruction (660).

A major cycle counter (670) and a minor cycle counter (680) are associated with the execution processor (600). On each minor cycle, the minor cycle counter (670) is adjusted. On each major cycle, the major cycle counter (680) is adjusted. The adjustment may include, incrementing or decrementing the counter. A register (690) is associated with the major cycle counter (670). A register (695) is associated with the minor cycle counter (680). The registers (690, 695) may optionally be used to hold values associated with the major and minor cycle counters (670, 680). For instance, at each adjustment of the major and minor cycle counters (670, 680), the registers (690, 695) may be set to decrement such that a defined stopping point occurs when the registers (690, 695) have a value of zero. By examining the registers (690, 695) periodically, a precise stopping point may be measured.

Figure 7:
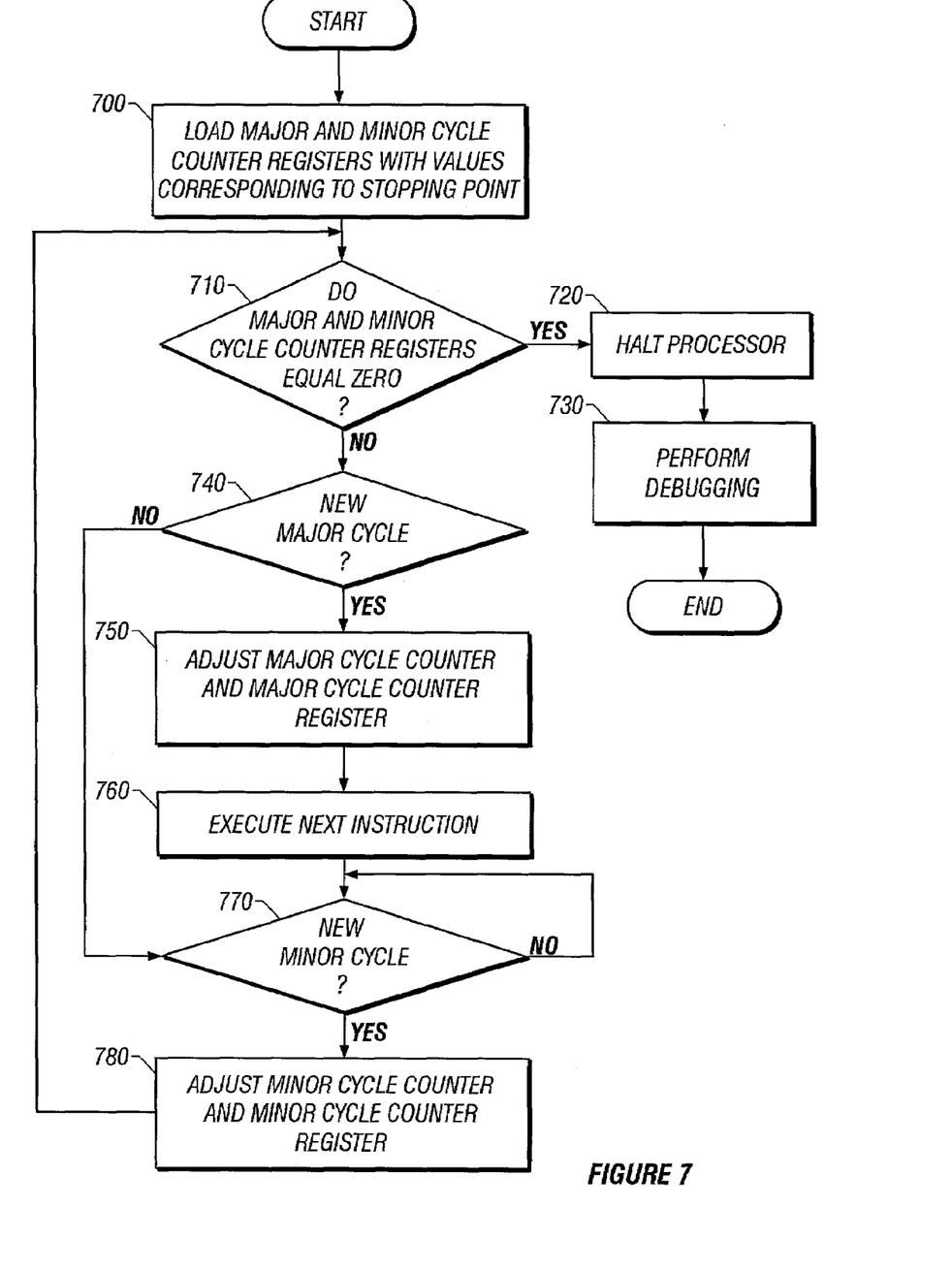
FIG. 7 shows debugging in an MPP environment according to an embodiment of the present invention.

An embodiment of the present invention that uses the above architecture is shown in FIG. 7. At Step 700, the major and minor cycle counter registers in the execution processor are loaded with values corresponding to the stopping point. A determination is made whether the major and minor cycle counter registers are zero (Step 710). If so, the processor halts (Step 720) and debugging is performed (Step 730).

Otherwise, a determination is made whether a new major cycle has initiated (Step 740). If so, the major cycle counter and major cycle counter register are adjusted (Step 750) and the next instruction is executed (Step 760). If, on the other hand, a new major cycle has not initiated (Step 740), a determination is made whether a new minor cycle has initiated (Step 770). If not, the system waits until a new minor cycle has initiated (Step 770). When Step 770 is true, the minor cycle counter along with associated register is adjusted (Step 780) and the process repeats until both registers reach zero (Step 710). At this point, the execution processor reaches the stopping point and halts synchronously with the other execution processors.

Figure 8:
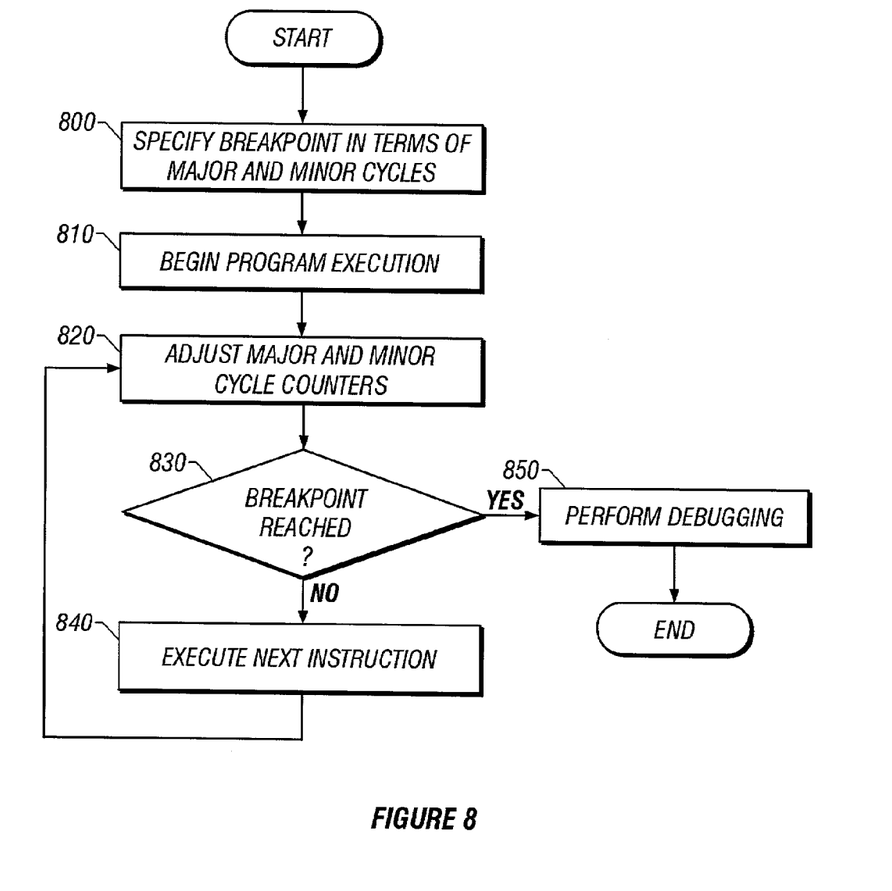
FIG. 8 shows debugging in an MPP environment using breakpointing in accordance with one embodiment of the present invention.

A breakpoint process may be performed by defining a stopping point at a specific time value defined by major and minor cycles. Breakpointing, according to one embodiment of the present invention, is shown in FIG. 8. A stopping point is obtained from a user in terms of a value of major cycle and minor cycles (Step 800). The program begins executing, for instance, by each execution processor executing an instruction in the program memory (Step 810). The major and minor cycle counters are adjusted (Step 820). A determination is made whether the breakpoint is reached by examining the values in the major and minor cycle counters and comparing the value to the stopping point (Step 830). If the breakpoint has not been reached, the next instruction is executed (Step 840) and Step 820 repeats. If, however, the breakpoint is reached (Step 830), the execution processors halt synchronously with the other execution processors and debugging is performed (Step 850).

A single-stepping of the program's execution may be performed by defining a stopping point every time the minor cycle counter changes value. To implement a single-step scheme, a machine state is checkpointed at a given major cycle. The major cycle counter and the minor cycle counter are loaded with the appropriate values for the stopping point. Single-stepping is implemented by returning to the checkpoint state and incrementing the value loaded into the major cycle and the minor cycle counters so that the machine state is one minor cycle beyond the previous stopping point.

Figure 9:
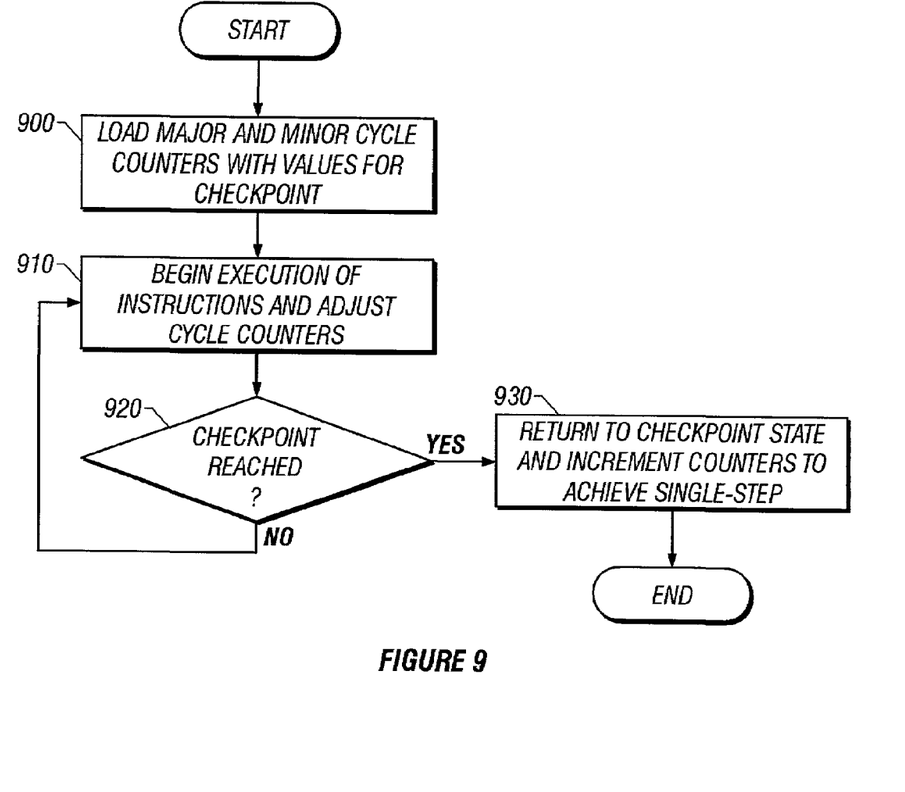
FIG. 9 shows debugging in an MPP environment using single-stepping in accordance with one embodiment of the present invention.

FIG. 9 is a flowchart showing virtual single-stepping in accordance with one embodiment of the invention. The major and minor cycle counters are loaded with the appropriate values for a checkpoint (Step 900). The machine state is checkpointed at a given major cycle. The system begins executing instructions and the cycle counters are adjusted (Step 910). A determination is made whether this is the time for the checkpoint (Step 920), if not, Step 910 repeats. When Step 920 is true, single-stepping is implemented by returning to the checkpoint state and incrementing the value loaded into the counters (Step 930) so that the machine state is one minor cycle beyond the previous stopping point. In this way, a "virtual" single-stepping is implemented without gated clocks.

Advantages of the present invention include one or more of the following. The invention provides the advantage of placing two counters in each execution processor to define a stopping point to effectively and efficiently debug a hardware logic design program in a MPP environment. The invention provides the advantage of using a defined stopping point to debug allows gated clocks and global control systems to be used in the logic design and simulation system. Those skilled in the art appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing debugging of an executable source program in a massively parallel processing environment comprising:

associating a major cycle counter and a minor cycle counter with each of a plurality of execution processors in the massively parallel processing environment, wherein a minor cycle is an instruction executed by an execution processor during a clock cycle;

obtaining a first stopping point value associated with the major cycle counter and a second stopping point value associated with the minor cycle counter;

executing instructions of the executable source program on each of the plurality of execution processors;

modifying a value of the major cycle counter and a value of the minor cycle counter; and halting each of the plurality of execution processors and returning control to the user if the value of the major cycle counter reaches the first stopping point value and the value of the minor cycle counter reaches the second stopping point value.

2. The method of claim 1, further comprising:
inspecting and modifying the executable source program.

3. The method of claim 1, further comprising:
loading the first stopping point value into the major cycle counter and the second stopping point value into the minor cycle counter; and adjusting the second stopping point value so that a machine state is one minor cycle removed from the second stopping point value.

4. The method of claim 3, wherein the first stopping point value is incremented following the completion of a major cycle.

5. The method of claim 3, wherein the second stopping point value is incremented.

6. The method of claim 1, further comprising:
storing the first stopping point value in a memory register.

7. The method of claim 1, further comprising:
storing the second stopping point value in a memory register.

8. The method of claim 1, further comprising:
storing the value of the major cycle counter in a memory register.

9. The method of claim 1, further comprising:
storing the value of the minor cycle counter in a memory register.

10. The method of claim 1, wherein the first stopping point value and the second stopping point value are both zero.

11. The method of claim 1, wherein the first stopping point value and the second stopping point value are both obtained from a user.

12. The method of claim 1, wherein modifying the value of the major cycle counter and the value of the minor cycle counter comprises incrementing.

13. The method of claim 1, wherein modifying the value of the major cycle counter and the value of the minor cycle counter comprises decrementing.

14. The method of claim 1, wherein the value of the major cycle counter increments after a pre-defined plurality of instructions are executed.

15. The method of claim 1, wherein the value of the major cycle counter decrements after a pre-defined plurality of instructions are executed.

16. The method of claim 1, wherein the value of the minor cycle counter increments after a single instruction is executed.

17. The method of claim 1, wherein the value of the minor cycle counter decrements after a single instruction is executed.

18. A method for performing debugging of an executable source program in a massively parallel processing environment comprising:
associating a major cycle counter and a minor cycle counter with each of a plurality of execution processors in the massively parallel processing environments, wherein a minor cycle is an instruction executed by an execution processor during a clock cycle;
obtaining a first stopping point value associated with the major cycle counter and a second stopping point value associated with the minor cycle counter;
executing instructions of the executable source program on each of the plurality of execution processors;
modifying a value of the major cycle counter and a value of the minor cycle counter;
halting each of the plurality of execution processors and returning control to the user if the value of the major cycle counter reaches the first stopping point value and the value of the minor cycle counter reaches the second stopping point value;
inspecting and modifying the executable source program;
storing the first stopping point value in a memory register;
storing the second stopping point value in a memory register;
storing the value of the major cycle counter in a memory register; and
storing the value of the minor cycle counter in a memory register.

19. An execution control system configured for a massively parallel processing environment comprising:
a major cycle counter and a minor cycle counter configured to be associated with each of a plurality of execution processors in the massively parallel processing environment, wherein a minor cycle is an instruction executed by an execution processor during a clock cycle;
a memory register to store a first stopping point value associated with the major cycle counter;
a memory register to store a second stopping point value associated with the minor cycle counter; and
an executable source program;
wherein each of the plurality of execution processors is halted and control is returned to the user to inspect and modify the executable source program if the first stopping point value is equal to a value of the major cycle counter and second stopping point value is equal to a value of the minor cycle counter.

20. The system of claim 19, further comprising:
a memory register to store the value of the major cycle counter.

21. The system of claim 19, further comprising:
a memory register to store the value of the minor cycle counter.

22. The system of claim 19, wherein the first stopping point value and the second stopping point value are both zero.

23. The system of claim 19, wherein the first stopping point value and the second stopping point value are both obtained from a user.

24. The system of claim 19, wherein the second stopping point value is incremented so that a machine state is one minor cycle removed from a previous stopping point value prior to restarting the plurality of execution processors.

25. The system of claim 19, wherein the value of the major cycle counter increments after a pre-defined plurality of instructions are executed.

26. The system of claim 19, wherein the value of the major cycle counter decrements after a pre-defined plurality of instructions are executed.

27. The system of claim 19, wherein the value of the minor cycle counter increments after a single instruction is executed.

28. The system of claim 19, wherein the value of the minor cycle counter decrements after a single instruction is executed.

29. An execution control system configured for a massively parallel processing environment comprising:
a major cycle counter and a minor cycle counter configured to be associated with each of a plurality of execution processors in the massively parallel processing environment, wherein a minor cycle is an instruction executed by an execution processor during a clock cycle;
a memory register to store a first stopping point value associated with the major cycle counter;
a memory register to store a second stopping point value associated with the minor cycle counter;
an executable source program;
a memory register to store a value of the major cycle counter; and
a memory register to store a value of the minor cycle counter;
wherein each of the plurality of execution processors is halted and control is returned to the user to inspect and modify the executable source program if the first stopping point value is equal to the value of the major cycle counter and second stopping point value is equal to the value of the minor cycle counter.

30. A computer system to perform debugging of an executable source program in a massively parallel processing environment, comprising:

a processor;

a memory; and software instructions stored in the memory for enabling the computer system under control of the processor, to perform:

associating a major cycle counter and a minor cycle counter with each of a plurality of execution processors in the massively parallel processing environments, wherein a minor cycle is an instruction executed by an execution processor during a clock cycle;

obtaining a first stopping point value associated with the major cycle counter and a second stopping point value associated with the minor cycle counter;

executing instructions of the executable source program on each of the plurality of execution processors;

modifying a value of the major cycle counter and a value of the minor cycle counter; and halting each of the plurality of execution processors and returning control to the user if the value of the major cycle counter reaches the first stopping point value and the value of the minor cycle counter reaches the second stopping point value.

31. An apparatus for performing debugging of an executable source program in a massively parallel processing environment comprising:

means for associating a major cycle counter and a minor cycle counter with each of a plurality of execution processors in the massively parallel processing environment, wherein a minor cycle is an instruction executed by an execution processor during a clock cycle;

means for obtaining a first stopping point value associated with the major cycle counter and a second stopping point value associated with the minor cycle counter;

means for executing instructions of the executable source program on each of the plurality of execution processors;

means for modifying a value of the major cycle counter and a value of the minor cycle counter; and means for halting each of the plurality of execution processors and returning control to the user if the value of the major cycle counter reaches the first stopping point value and the value of the minor cycle counter reaches the second stopping point value.

* * * * *

UNITED STATES PATENT AND TRADEMARK OFFICE
CERTIFICATE OF CORRECTION

PATENT NO. : 7,007,268 B2
DATED : February 28, 2006
INVENTOR(S) : David R. Emberson It is certified that error appears in the above-identified patent and that said Letters Patent is hereby corrected as shown below:

Title page,
Item [56], References Cited, U.S. PATENT DOCUMENTS, replace
"2003/0066054 A1 *   4/2003   Aarsts et al.   717/129" with
-- 2003/0066054 A1 *   4/2003   Aarts et al.   717/129 --.

Column 9,
Line 44, replace "environments" with -- environment --.

Column 11,
Line 14, replace "environments" with -- environment --.

Signed and Sealed this

Thirtieth Day of May, 2006

JON W. DUDAS
*Director of the United States Patent and Trademark Office*